Jan. 23, 1951 U. SABATINI ET AL 2,539,328
ENGAGING DEVICE FOR MECHANICAL RELAYS
Filed Dec. 13, 1946

INVENTOR:
UGO SABATINI AND
VALERIO CIAMPOLINI
BY

Patented Jan. 23, 1951

2,539,328

UNITED STATES PATENT OFFICE 2,539,328

ENGAGING DEVICE FOR MECHANICAL RELAYS

Ugo Sabatini and Valerio Ciampolini, Milano, Italy

Application December 13, 1946, Serial No. 715,948
In Italy January 18, 1946

7 Claims. (Cl. 74—527)

Many automatic devices that are intended to become operative when a certain physical factor reaches a certain value are provided with a mechanical relay which enables a sensitive element for measuring the said physical factor to release, by means of the small power which it is capable of developing owing to its own sensitivity and accuracy, a mechanical force of greater magnitude which is available and pre-arranged in a potential form.

The fundamental element of such a mechanical relay is the engaging device which, for example, may be used in automatic electric switches, in the valves of automatic extinguishers, and so forth.

An object of the present invention is to provide for mechanical relays with a high power ratio an engaging device which is very simple to construct, which is resistant to wear and which enables the attainment of such high degree of sensitivity and reduced size and small current consumption and also low cost of manufacture in the apparatus on which it is used as to have no equal in existing apparatus.

An engaging device in accordance with the invention essentially comprises a set of balls mounted between guideways provided in an appropriate casing, so that at least two of them, which are capable of opposite radial movements, normally extend beyond said casing and form a projection effecting the required engagement by interposing between them a central ball which is movable at right angles to the others. By pushing said central ball outside the plane of the other balls the latter are enabled to enter the casing thereby to disengage the device.

Preferably, in order to give the engagement sufficient stability in practice, the balls are made of equal diameters and the central ball is normally so arranged that its centre is slightly outside or beyond the plane passing through the centres of the other balls, on the opposite side to that towards which its disengagement is to be affected; this is obtained by giving the guideways of the casing, which are intended to accommodate the outer balls and to permit of their radial movement, a slightly larger diameter than that of the balls.

By way of example one embodiment of the invention, employing only three balls, is illustrated diagrammatically on the accompanying drawing, whereon:

Figure 1:
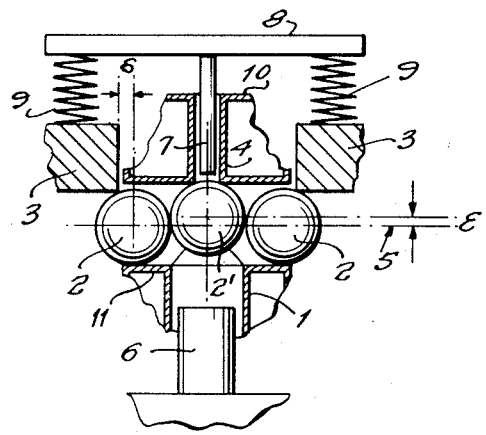
Fig. 1 is a view, partly in section, of the device in the "engaged" position.

In the illustrated embodiment the ball-holder casing 1 takes the form of a tubular T-shaped duct, the horizontal arm 11 of which is only slightly longer than twice the diameter of one of the balls, so that when all three balls 2, 2', 2 are substantially aligned therein (as shown in Fig. 1) the two outer balls 2 extend through and beyond the opposite open ends of the tubular duct a distance slightly less than their radius and thereby effect the engagement of the body 3, which may comprise the movable system of a switch controlled in known manner by resilient means 9.

Figure 2:
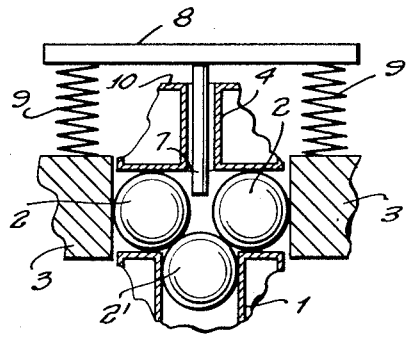
Fig. 2 is a similar view in the "released" position.

By the action of the said resilient means which tends to depress the movable body 3, 3 downward, and when the centre ball 2' is displaced as hereinafter explained, the balls 2 can be moved towards one another so that they no longer extend beyond the horizontal arm of the tubular duct 1, whereby free downward movement of the body 3 responsive to the bias or pressure of said resilient means is permitted (Fig. 2).

The force F (Fig. 3) with which the engaging device reacts to the action of the said resilient means by which the body 3 is controlled, can be overcome by acting on the central ball 2' with a force which is smaller than the force of said resilient means, in proportion to play $\epsilon$ between the balls and the horizontal arm of the T-shaped duct, or the distance $\delta$ between the centre of the balls 2, 2 in their extreme outer position and the contact edge 3', 3' of the body 3.

Figure 3:
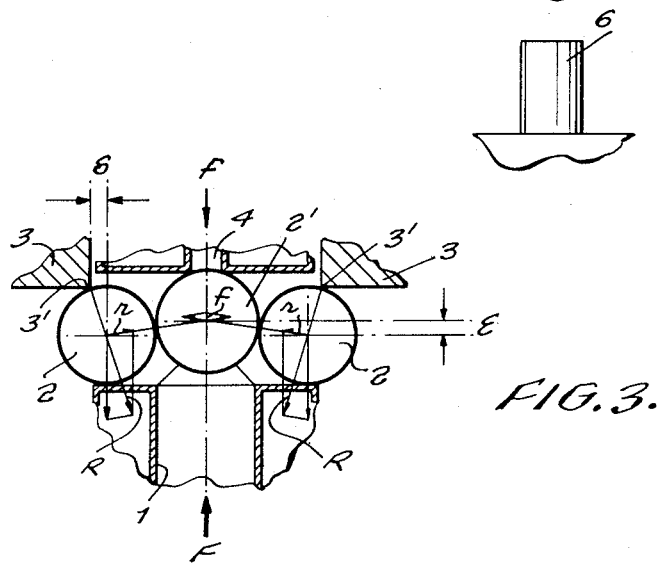
Fig. 3 is a view corresponding to Fig. 1 but drawn to a larger scale.

The ratio of these forces is clear from Fig. 3 in which the force F, which is of opposite sign to the resultant forces R, R which pass through the edges 3', 3' of the body 3, can be balanced by a force $f$ which may be defined as the equilibrant of the components $r$, $r$ of the forces R, R and passes through the centre of the ball 2'. This resultant is precisely proportional to the plays $\epsilon$ and $\delta$ hereinbefore specified.

The low ratio $f/F$ which can be obtained with this arrangement precisely forms the fundamental value of the latter; it naturally affects the power required to obtain the disengagement of the device, for which purpose it is only necessary to move the central ball 2' down by means of a plunger 7 normally held raised by springs 9 beneath head 8 above upper end 10 of vertical passage 12 above aperture 4, through a distance very slightly greater than the play $\epsilon$. The power required will be proportional to $f \times \epsilon \div 2$ and will therefore be smaller substantially in proportion as the play $\epsilon$ is smaller, which play in its turn affects the value of $f$.

Thus, the ball 2' can be pushed down through the plane or straight line 5 extending through the center of the balls 2, 2 whatsoever may be the strength of the spring which acts on the body 3, by acting on the said ball 2' through the aperture 4 of the tubular duct 1 with a practically negligible force. The device then assumes the disengaged position shown in Fig. 2.

Engagement is readily restored by altering the relative positions of T-shaped tubular duct member or casing 1 together with balls 2, 2', and 2 and relay body 3 from the position shown in Fig. 2 into the position shown in Fig. 1, wherein tubular casing 1 is disposed largely below the relay body 3. In this position, the opposite end openings of tubular casing 1 are no longer blocked by the inner walls of relay body 3 but are sufficiently open beneath this body 3 to allow end balls 2, 2 to extend limited distances out through these end openings when the central ball 2' encounters a suitable optionally stationary, upwardly projecting resetting member 6. The result is that central ball 2' is returned upward toward aperture 4 in the T-shaped tubular casing 1, forcing end balls 2, 2 apart so that they extend through the mentioned end openings and engage again with the lower inner edges of relay body 3.

The described engaging device may be applied not only to automatic switches, but also to many other similar arrangements, as for example, the valves of extinguishers and in general where it is required to provide a mechanical relay with a high power multiplication ratio.

Having now particularly described and ascertained the nature of our said invention and in what manner the same is to be performed, we declare that what we claim is:

1. In a mechanical relay, in combination a casing comprising, walls forming a confined space having opposed openings; a relay body movable along a path across said openings outside said confined space; a set of balls forming a chain in said confined space and being movable into and out of a position of relative alignment, said balls being so dimensioned relative to said confined space that when the balls are in substantial alignment the ends of said chain of balls are forced to protrude through said openings thereby engaging said movable relay body; and means for moving said balls out of relative alignment to an extent to permit said protruding chain portions to retract into said casing whereby the disengagement of said movable relay body is effected.

2. In a mechanical relay, in combination a casing comprising, walls forming a confined space having opposed openings; a movable relay body; a set of balls forming a chain in said confined space and being movable into and out of a position of relative alignment, said balls being so dimensioned relative to said confined space that when the balls are in substantial alignment the ends of said chain of balls are forced to protrude through said openings; means for moving said relay body along a path across said openings outside said confined space and in opposition to said protruding chain portions, said movement being blocked when said balls are in substantial alignment; and means for moving said balls out of relative alignment to an extent to permit said protruding chain portions to retract into said casing whereby said movable relay body is released for movement along said path across said openings.

3. In a mechanical relay, in combination a casing comprising, walls forming a confined space having opposed openings; a movable relay body; a set of three balls including two terminal balls and an intermediate ball arranged in said casing and adapted for movement into and out of a position of substantial alignment, said balls being so dimensioned relative to said confined space that when the balls are in substantial alignment said terminal balls protrude through said openings of said casing; means for moving said relay body along a path across said openings outside said confined space and in opposition to said protruding terminal balls, said movement being blocked while said balls are in substantial alignment and said terminal balls protrude through said openings; and means for moving said balls out of relative alignment to an extent to permit said terminal balls to be displaced into said casing by said relay body and thereby to free said relay body for movement across said openings.

4. In a mechanical relay, in combination, walls defining an elongated casing having openings in its ends; a channel member extending from said casing; a movable relay body; a set of three balls including two terminal balls and one intermediate ball disposed in said casing, the length of said casing between said openings being in excess of the diameter of said terminal balls and being below the aggregate diameters of said three balls so that the terminal balls protrude through said openings when all three balls are in substantial alignment, and the height of said casing exceeding the diameter of said intermediate ball by a fraction of its radius and the said channel member having a diameter in excess of said intermediate ball; means to impart a yielding movement to said relay body along a path across said openings outside said casing; and means alternatively to displace said intermediate ball into said channel member thereby permitting retraction of said terminal balls in response to the action of said relay body and to displace said intermediate ball towards the wall of said casing opposite said channel member and out of the plane passing through the center of said terminal balls thereby fixing the three balls in a position where the said two terminal balls are forced into said openings of said casing so as to block the movement of said relay body.

5. In a mechanical relay, in combination, walls defining an elongated casing having openings in its ends; a channel member extending centrally at right angles from said casing; a movable relay body; a set of three balls including two terminal balls and one intermediate ball disposed in said casing, the length of said casing between said openings being in excess of the diameter of said terminal balls and being below the aggregate diameters of said three balls so that the terminal balls protrude through said openings when all three balls are in substantial alignment, and the height of said casing exceeding the diameter of said intermediate ball by a fraction of its radius and the said channel member having a diameter in excess of said intermediate ball; means to impart a yielding movement to said relay body along a path across said openings outside said casing; and means alternatively to displace said intermediate ball into said channel member thereby permitting retraction of said terminal balls in response to the action of said relay body and to displace said intermediate ball towards the wall of said casing opposite said channel member and out of the plane passing through the center of said terminal balls thereby fixing the three balls in a position where the said two terminal balls are forced into said openings of said casing so as to block the movement of said relay body.

6. In a mechanical relay, the combination of a movable casing comprising a plurality of walls spaced rigidly apart to form a confined space having opposite openings; a relay body movable along a path across the opposite openings exteriorly of the confined space; a group of balls forming an associated series disposed in said confined space and movable into and out of a position of substantial alignment, said balls being so relatively dimensioned with respect to the dimensions of said confined space that when the balls are in substantial alignment, the ends of said series of balls forcibly protrude through said opposite openings and thereby engage said movable casing; a depressible member movably supported upon said movable casing in effective position to dislodge an intermediate ball of the series to a sufficient extent from alignment with the other balls in said series to allow the extreme end balls to withdraw into the confined space in said casing and thereby effect disengagement of said relay body; and means for normally retaining the depressible member in raised inactive position.

7. In a mechanical relay, the combination of a movable casing comprising a plurality of walls spaced rigidly apart to form a confined space having opposite openings; a relay body movable along a path across the opposite openings exteriorly of the confined space; a group of balls forming an associated series disposed in said confined space and movable into and out of a position of substantial alignment, said balls being so relatively dimensioned with respect to the dimensions of said confined space that when the balls are in substantial alignment, the ends of said series of balls forcibly protrude through said opposite openings and thereby engage said movable casing; a depressible member movably supported upon said movable casing in effective position to dislodge an intermediate ball of the series to a sufficient extent from alignment with the other balls in said series to allow the extreme end balls to withdraw into the confined space in said casing and thereby effect disengagement of said relay body; means for normally retaining the depressible member in raised inactive position; and a restoring member substantially opposite to said depressible member disposed in the path of said intermediate ball of said series and effective to restore said intermediate ball into substantial alignment with the other balls in the series when said casing is moved in the direction leading to said restoring member.

UGO SABATINI.
VALERIO CIAMPOLINI.

REFERENCES CITED

The following references are of record in the file of this patent:

UNITED STATES PATENTS

| Number | Name | Date |
| --- | --- | --- |
| 2,329,182 | Boynton | Sept. 14, 1943 |

FOREIGN PATENTS

| Number | Country | Date |
| --- | --- | --- |
| 502,872 | Great Britain | Mar. 24, 1939 |
| 615,187 | Great Britain | Jan. 3, 1949 |